United States Patent
Henderson

(10) Patent No.: US 12,079,779 B2
(45) Date of Patent: Sep. 3, 2024

(54) MULTIPLE DATA SOURCE DATE-BASED USER INTERFACE SYSTEM AND METHOD

(71) Applicant: Annum LLC, St. Paul, MN (US)

(72) Inventor: Patricia Radford Henderson, St. Paul, MN (US)

(73) Assignee: Annum LLC, St. Paul, MN (US)

( * ) Notice: Subject to any disclaimer, the term of this patent is extended or adjusted under 35 U.S.C. 154(b) by 114 days.

(21) Appl. No.: 17/394,155

(22) Filed: Aug. 4, 2021

(65) Prior Publication Data

US 2022/0044206 A1     Feb. 10, 2022

Related U.S. Application Data

(60) Provisional application No. 63/060,933, filed on Aug. 4, 2020.

(51) Int. Cl.
| | |
|---|---|
| *G06Q 10/1093* | (2023.01) |
| *G06F 16/25* | (2019.01) |
| *G06Q 10/0631* | (2023.01) |
| *G06Q 30/0251* | (2023.01) |

(52) U.S. Cl.
CPC ........ *G06Q 10/1093* (2013.01); *G06F 16/252* (2019.01); *G06Q 10/06313* (2013.01); *G06Q 10/06314* (2013.01); *G06Q 30/0251* (2013.01); *G06Q 30/0264* (2013.01)

(58) Field of Classification Search
CPC ......... G06Q 10/1093; G06Q 10/06313; G06Q 10/06314; G06Q 30/0251; G06Q 30/0264; G06F 16/252
See application file for complete search history.

(56) References Cited

U.S. PATENT DOCUMENTS

| | | | | |
|---|---|---|---|---|
| 8,321,275 | B2* | 11/2012 | Collins | G06Q 30/0257 |
| | | | | 705/14.42 |
| 2011/0078016 | A1* | 3/2011 | Wagenblatt | G06Q 30/0244 |
| | | | | 705/14.43 |
| 2016/0055444 | A1* | 2/2016 | Chetan | G06Q 30/02 |
| | | | | 705/7.14 |

OTHER PUBLICATIONS

Kassam, How to Define Your Omnichannel Marketing Plan with Marketing Calendar Software, Jan. 12, 2018, https://www.forbes.com/sites/forbestech council/2018/01/12/how-to-define-your-omnichannel-marketing-plan-with-marketing-calendar-software/?sh=153219975afa, pp. 1-6 (Year: 2018).*

* cited by examiner

*Primary Examiner* — John Van Bramer
(74) *Attorney, Agent, or Firm* — Forsgren Fisher; Daniel A. Tysver; James M. Urzedowski

(57) ABSTRACT

A system and method are presented that integrate date-related data from a variety of disparately defined data sources into a single user interface. Date-related data is defined in tactics that are associated with types. The types are associated with additional field definitions that allow for a single tactic data entity to be created for a variety of tactic types, with different tactic types being associated with different sets of additional fields. Cues are also used to automate the generation of date-related tactics. Cues can be triggered by the creation of trigger tactics of a predetermined type, or through an event in a subscribed database. Individual tactics record estimated and actual expenses for budgeting purposes. Finally, plan hierarchies allow for the integrated viewing of date-based tactics defined at different levels of the hierarchy.

17 Claims, 10 Drawing Sheets

Figure 8

| | | | | | |
|---|---|---|---|---|---|
| | Generate New Tactic | | | | — 800 |
| User | UserName | | Plan | Plan #1 | — 810 |
| Channel | ▼ | | Tactic Type | ▼ | |
| Platform | | | | | |

Main Tactic Fields — 820

| | | | | | |
|---|---|---|---|---|---|
| Date | 12/1/21 | Multi-Days? ☐ | Time | | Repeat? ☐ |
| Topic | | | | | |

Budget / Costs — 830

| | | | |
|---|---|---|---|
| Estimated | | Actual Cost | |

Additional Tactic Fields — 840

Author

Tags — 850

| | | | |
|---|---|---|---|
| Initiative | ▼ | Phase | ▼ |
| Objective | ▼ | Keywords | ▼ |
| Category | ▼ | | |

Cues — 860

870 — Cue #1: (First Common Topic) ← 872

880 → Channel | Channel #1 | Tactic Type | Type 1.A | (Delete) — 862
When | 2 Days | Before | At 8am | To | Day | Of Tactic 882 → Channel | Channel #2 | Tactic Type | Type 2.A | (Delete) — 862
892 → When | Day | Of Tactic | All day 890 — Cue #2: (Second Topic) — 862
894 → Channel | Channel #1 | Tactic Type | Type 1.B | (Delete)
When | 7 Days | After | All day (SAVE) — 895

MULTIPLE DATA SOURCE DATE-BASED USER INTERFACE SYSTEM AND METHOD

FIELD OF THE INVENTION

The present invention is directed toward solving the technical problem of combining disparate data from multiple data sources into one date-oriented user interface by separating additional field definitions from the database definition of the data sources.

SUMMARY OF THE INVENTION

This application relates to a system capable of integrated date-related data from a variety of disparately defined data sources into an integrated user interface. Users want to see events from multiple data sources within one date-oriented user interface. Current user interfaces only show data from one data source at a time. For example, data is frequently stored as tables, such as in a spreadsheet or table-based database system. While a system that utilizes a single table or spreadsheet can show all events from that data source in a single interface, those systems cannot combine multiple types of data (data from disparate types of tables) into a single lead interface.

The present system overcomes these limitations of prior art user interfaces by accepting date and time related data from a plurality of data sources, with each data source using different and sometimes conflicting field contents. Date-related data is defined in tactics. Tactics are created according to a tactic type. Tactic types can be associated with multiple additional field definitions. The additional field definitions allow for a single tactic data entity to be created for a variety of tactic types, with each tactic type being associated with a different set of fields that are defined using the additional field definitions. The present system then integrates the data stored in the tactics in a manner that presents a unified interface while allowing the creation and updating of data stored in the original data source.

The invention also utilizes cues to automate the generation of date-related tactics. Cues can be triggered by the creation of trigger tactics. These cues are associated directly with tactic types, with new tactics of the appropriate type triggering a cue. Cues can also be triggered by an event in a subscribed database. Cues can generate multiple proposed tactics that are generally reviewed by a user before being fully implemented.

The invention also defines budget and actual expense information into the tactic definitions. Budgets can be established at a plan or channel level. Tactics record estimated and actual expenses associated with the tactics. Data from tactics are grouped together to compare with plan or channel budgets.

The invention also defines a plan hierarchy to allow for the integrated viewing of date-based tactics defined at different levels of the hierarchy. Shared definitions of channels and tactic types can be used to simplify filtering.

BRIEF DESCRIPTION OF THE DRAWINGS

FIG. 8 is a user interface showing the generation of a tactic and related cue data.

DETAILED DESCRIPTION

System

Figure 1:
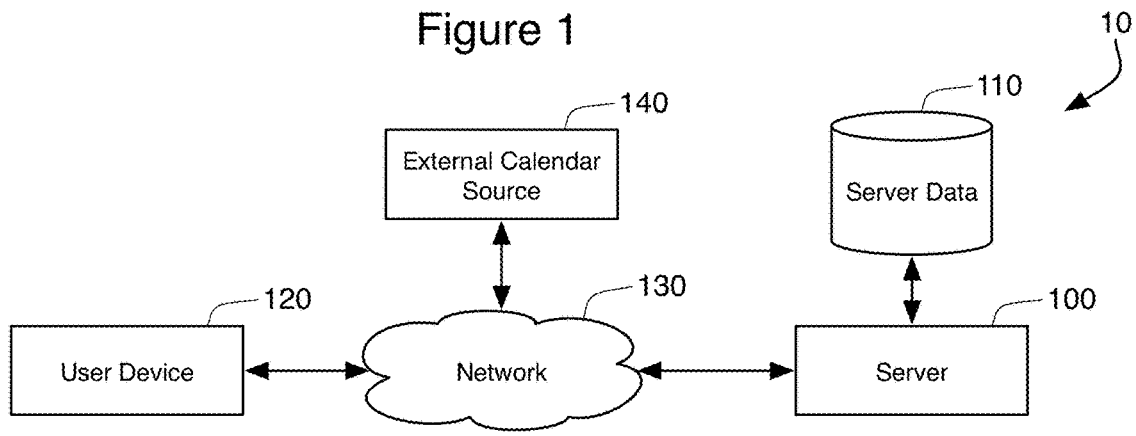
FIG. 1 is a schematic view of a system for combining data from disparate table sources into a common, date-based user interface.

FIG. 1 shows a system 10 that includes a server 100 which accesses data 110 to provide a user interface to a user device 120 over a network 130. The server 100 is also designed to access data from an external calendar source 140 and to utilize this data in the automated creation of the data 110. The external calendar source 140 also provides data used in the generation of the user interface. The external calendar source 140 is typically provided by another server computing device, thus the external calendar source 140 will also be referred to herein as the calendar server 140. In some cases, the external calendar source 140 is a downloaded calendar of events that is stored locally and is accessible to the server 100. Such a calendar source is external because it is not stored originally as part of the server data 110, although it may be imported into that data (as is described in further detail below).

The server 100, the user device 120, and the calendar server 140 shown in FIG. 1 are all computing devices. That means that each device includes a processor for processing computer programming instructions. In most cases, the processor is a CPU, such as the CPU devices created by Intel Corporation (Santa Clara, CA), Advanced Micro Devices, Inc (Santa Clara, CA), or a RISC processer produced according to the designs of Arm Holdings PLC (Cambridge, England). Furthermore, these computing devices 100, 120, 140 have memory, which generally takes the form of both temporary, random access memory (RAM) and more permanent storage such a magnetic disk storage, FLASH memory, or another non-transitory (also referred to as permanent) storage medium. The memory and storage (referred to collectively as "memory") contain both programming instructions and data. In practice, both programming and data will be stored permanently on non-transitory storage devices and transferred into RAM when needed for processing or analysis.

The data 110 shown in FIG. 1 is stored in some type of data store (also referred to as data or database). This data store 110 may physically be located within or as part of the server 100, or it may be located remotely from the server 100 over a local area network, a storage area network, or even a remote wide area network. If located remotely, the data store 110 may be controlled by its own data controller computer. The data store 110 generally includes defined database entities. These entities may constitute database tables in a relational database, or database objects in an object-oriented database, or any other type of database entity usable with a computerized database. In the present embodiment, the phrase database entity refers to data records in a database whether comprising a row in a database table, an instantiation of a database object, or any other populated database entity. Data within the data store 110 can be "associated" with other data. This association can be implemented using a variety of techniques depending on the technology used to store and manage the database, such as through formal relationships in a relational database or through established relationships between objects in an object-oriented database.

Figure 2:
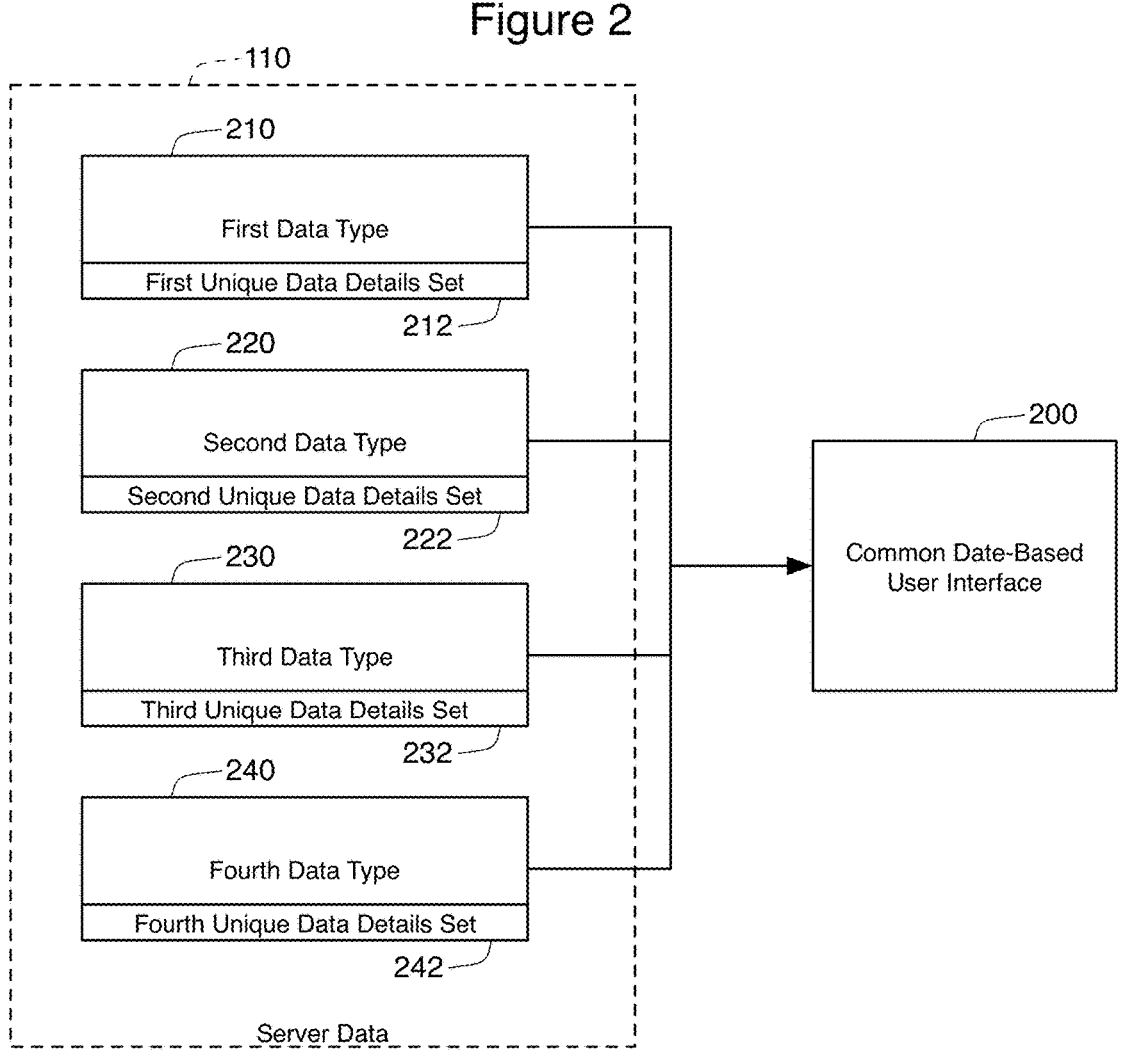
FIG. 2 is a schematic view of different data types using unique data detail sets.

FIG. 2 shows the content of the server data 110 being used to create a common date-based user interface 200 that is presented to the user device 120. This interface 200 can be presented to the remote user device 120 over the network 130 through a variety of known mechanisms. For instance, if the user device 120 is a laptop or desktop computer, the device 120 may utilize a web browser, and the interface 200 could be presented as a webpage or website provided by a web server operating on the server 100. If the user device 120 is a mobile device, the interface 200 could still be presented through a web interface. Alternatively, an app could be developed that operates on the user mobile device 120. This app could request data from the server 100 over the network 130 and could utilize that data to create the user interface 200 using the app's own programming. It is also possible to develop a custom application that operates on a laptop or desktop user device 120 in a similar manner to an app operating on a mobile device.

FIG. 2 shows four different data types 210, 220, 230, 240 residing in the server data 110. For example, the first data type 210 has a unique set of data details or fields 212, while the second data type 220 has its set of data details 222, the third data type 230 has its set of data details 232, and the fourth data type 240 has a fourth set of data details 242. These different sets of data details or fields 212, 222, 232, 242 indicate that different types of data are being maintained by the different data types 210, 220, 230, 240. If these data types 210, 220, 230, 240 were defined as data tables, they would contain different columns or fields, as each is customized to maintain its own data details.

The server 100 contains programming that can extract date-based information from each type 210, 220, 230, 240 and present this data in the common date-based user interface 200. Note that the phrase date-based information or date-based data includes data that includes both time of day as well as date information. In some embodiments, each type 210, 220, 230, 240 contains date-based data, but this data is maintained inconsistently. Some types of data 210, 220, 230, 240 may have only one date, or both a start and end date. Some data are associated with a time of day, but some are not. Some have only a start time and no end time. Some records use a duration rather than an end date or time, with the duration being designated as minutes/hours, a full day, multiple days, multiple weeks, multiple months, or multiple years.

Data and Method

Prior art systems failed to integrate these disparate data types 210, 220, 230, 240 into a single date-based user interface 200. However, the data structures 300 of the server data 110 shown in FIG. 3 allows for an easy integration of disparate types of data.

Figure 3:
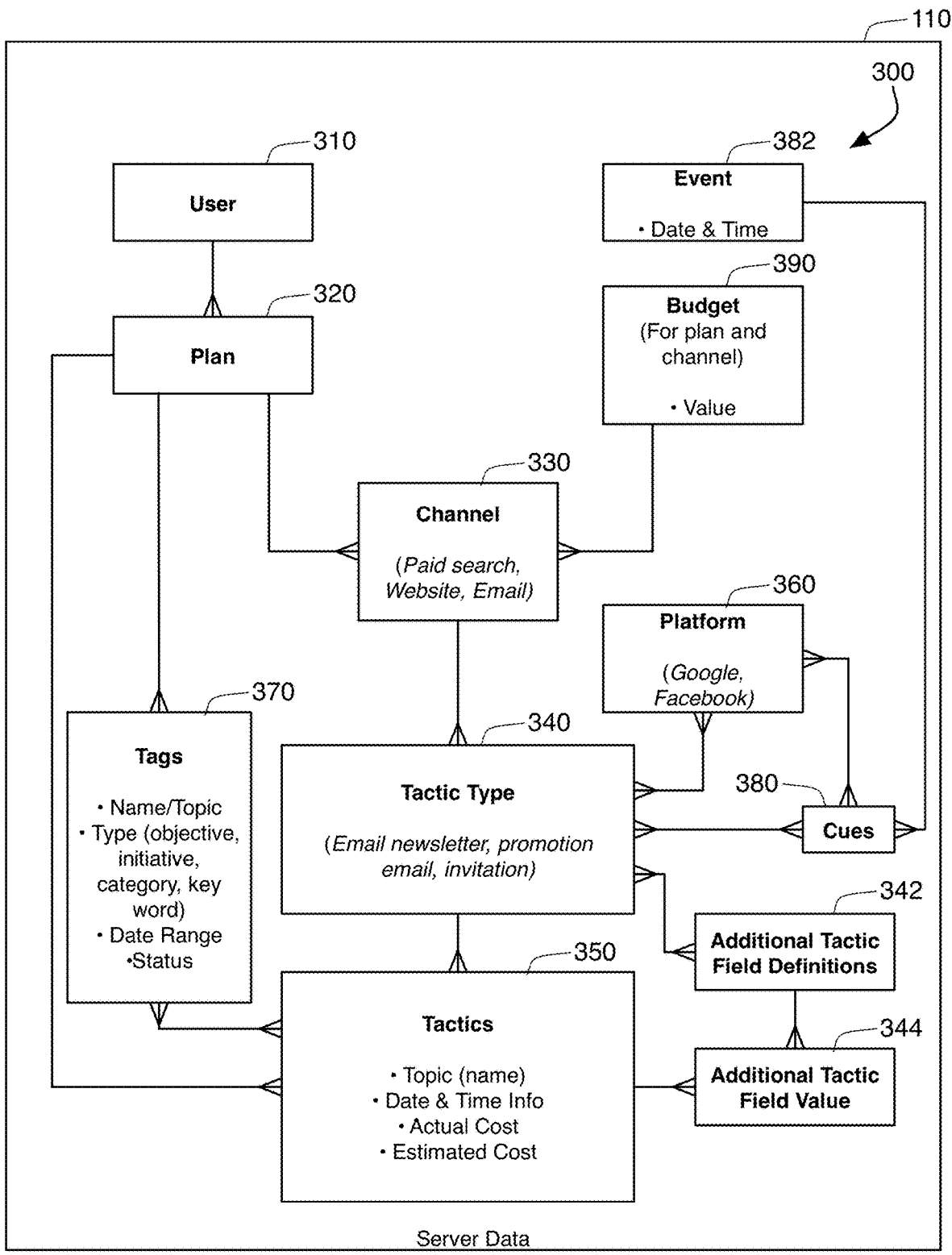
FIG. 3 is a schematic view of the data entities used in the system of FIG. 1.

These data structures 300 can be considered separate data entities within the data store 110, meaning that they might constitute separate data tables in a relational database system, or separate objects in an object-oriented system. In FIG. 3, relationships between database entities 300 are shown using crow's-foot notation to indicate the types of relationships between these entities (such as a one-to-many relationship). Not all the data stored in the server data 110 is shown in FIG. 3, as only details directly relevant to producing the improved user interface 200 are disclosed. Furthermore, the distinction between different entities 300, such as the user data entity 310 and the plan entity 320, are presented for ease in understanding the data being stored and the relationship between data. It is not required that separate entities be created to exactly match the different data entities shown in this FIG. 3 or in the other Figures, as data entities can be merged or split without impacting the functionality of the overall system 10. Furthermore, the individual relationships shown using crow's foot notation need not be implemented exactly as shown, meaning that a many-to-many relationship may frequently be, for example, substituted for a one-to-many relationship without altering the spirit of the invention. Finally, to simplify this discussion, a database entity 300 may be referred to using the name of the entity without explicitly stating that the description refers to a data construct within the data store 110. Thus, the user database entity 310 may be referred to simply user 310, and the tactic database entity 350 may simply be referred to as a tactic 350. In most cases, these references will refer to the data stored in the data stores 110, not the abstract concept of a tactic nor an actual person who is acting as a user.

In FIG. 3, a user data entity 310 is defined so that the server 100 can service the user devices 120 of multiple users. Each user 310 may want to track different groupings or plans 320 of data, so a separate plan 320 entity is used. For example, a user may wish to track different types of data entities 300 in association with marketing for different clients. Each client can be associated with a different plan data entity 320 so that separate user interfaces 200 are easily presented for each plan 320.

FIG. 3 presents but one embodiment of the data structures 300 that can be used to present the user interface 200. In this embodiment, a plan entity 320 is associated with multiple channel entities 330. Channels 330 can be used in marketing efforts to define broad categories of efforts or tactics that can be used for communication. Channels 330 can be, for example, paid search, or a website, or print advertising, or physical signage, or Email. In the type of data hierarchy defined by data structures 300, the user element 310 is at the top, with multiple plans 320 able to be associated with each user 310. Multiple channels 330 are then available within each plan 320. Under each channel 330 are different tactic types 340 that can be used within each channel 330. For example, the "website" channel 330 might relate to the following tactic types 340: "blog posts," "home page banner," "product detail page," "customer success story," or "landing page;" while the "Email" channel 330 might relate to these tactic types 340: "newsletter," "promotion," or "invitation." In the context of this application, the term channel can be read to mean a category that defines a plurality of tactic types 340.

The tactic entity 350 relates to a particular date-based event or happening defined by one of the tactic types 340. In the context of this application, a tactic 350 is simply a data entity that contains certain information, such as a topic or name, as well as time/date information (or simple "date" information, which, for the purposes of this application, includes both a date and a time of day). For instance, a spring newsletter tactic 350 might be associated with the newsletter tactic type 340, which in turn is related to the Email channel 330. A tactic 350 to present a specific message on an electronic sign in a bank lobby might be associated with an electronic sign tactic type 340, which is related to a signage channel 330. In many embodiments, the existence of a date-based tactic 350 in the data entities 300 does not trigger the called for event to actually occur. The digital sign tactic 350, for instance, will not cause a digital sign to automatically display some message. Rather, the tactic 350 is designed to inform a user of the need to perform this act. In other embodiments, the tactic 350 is integrated through additional interface programming to automatically trigger the event—the digital sign display will automatically be updated at the moment indicated by the digital sign tactic 350.

As shown in FIG. 3, some data (referred to herein as data fields) can be directly defined within the tactic entity 350, such as the name (also referred to as the topic) for the tactic 350, actual and estimated costs (which are described in more detail below), and date and timing information. The information that is defined within the tactic entity 350 is the data that would be used in most or all tactics 350 maintained by the server 100 in the server data 110 regardless of the tactic type 340 or channel 330. However, as explained in connection with FIG. 2, different data types 210, 220, 230, 240 are associated with different unique sets of data details or fields 212, 222, 232, 242. These different types 210, 220, 230, 240 are implemented using the tactic type element 340. The data fields defined within the individual tactics 350 would be only those fields that are generally applicable across all tactics 350. The other fields are defined through the additional tactic field definitions 342 and the additional tactic field values 344 data elements.

Figure 4:
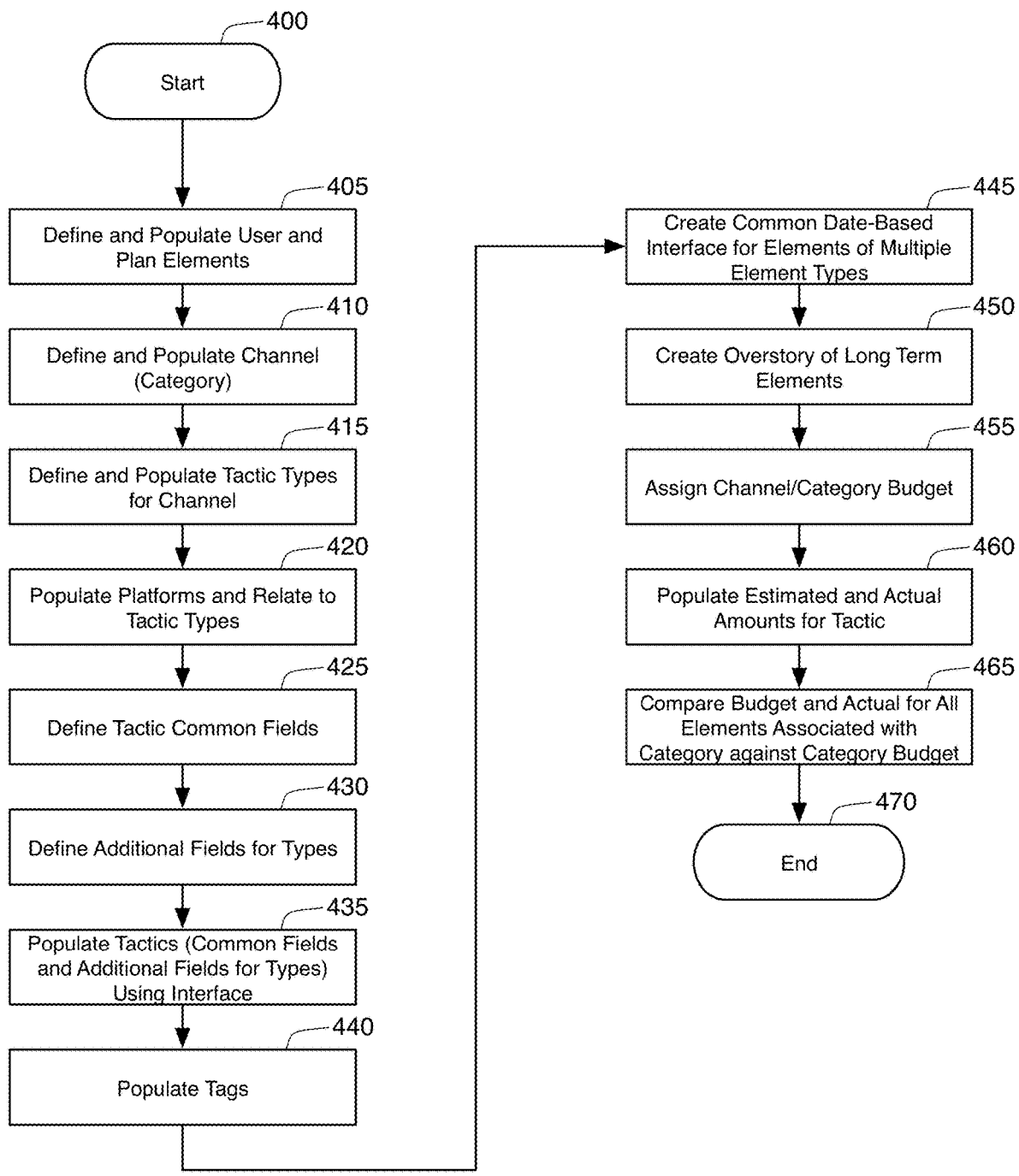
FIG. 4 is a flow chart showing a process for defining data plans, channels, tactic types, and tactics, and integrating tactics of disparate types into a common interface.
Figure 5:
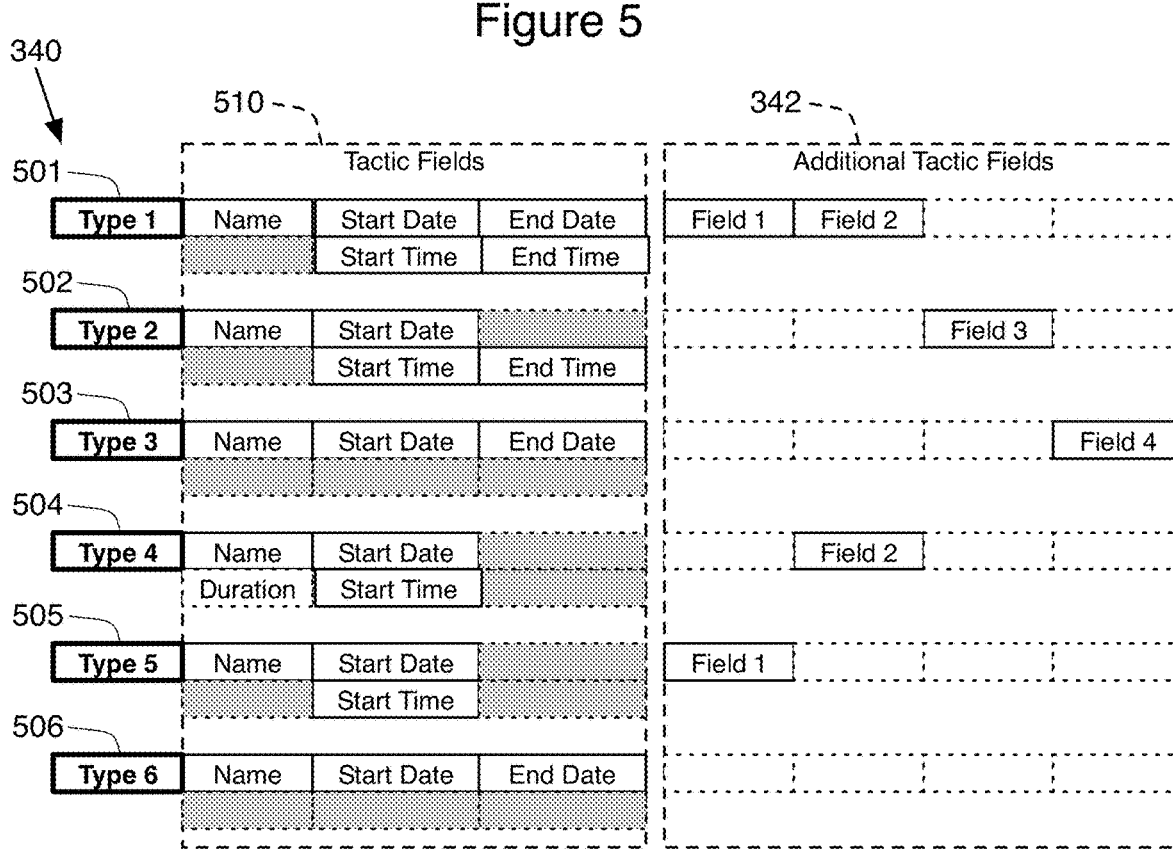
FIG. 5 is a schematic view of data associated with tactic types.
Figure 6:
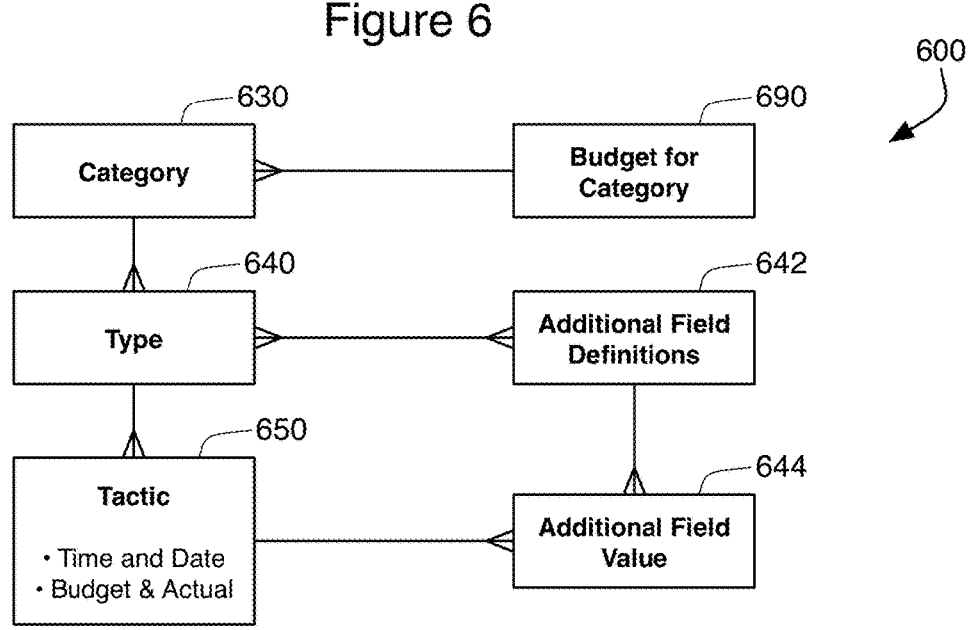
FIG. 6 is a simplified schematic view of data entities used by an embodiment of the present invention.

This is understood more easily in the context of method 400 of FIG. 4, the schematic illustration of FIG. 5, and the alternative elements shown in FIG. 6. Turning first to FIG. 4, a method 400 of generating the common date-based interface 200 is presented. The first step 405 is to define user 310 and plan 320 elements in the data store 110 and to populate this data 310, 320. The "defining" of these elements would involve defining the entities themselves using, for example, and database programming language or a user interface. The population of the data 310, 320 involves creating an new entity of the defined type and then placing actual data into instances of those entities. Relationships between users 310 and plans 320 can be established as part of this population of data, with one user 310, for example, being associated with multiple plans 320. The second step 410 is to define and populate the channel data entity 330, which includes relating the channels 330 with the plans 320 that are associated with the user 310.

Step 415 defines the tactic type data entities 340. These are then populated, with the defined types 340 being associated with a particular channel 330. In the example above, tactic types 340 would be defined for "blog posts," "home page banner," "product detail page," "customer success story," and "landing page," and each of these tactic types 340 would be associated with the website channel 330.

Some tactic type entities 340 are associated with a platform entity 360. For example, in the marketing context, a tactic type 340 might be a post to a social media platform. The tactic type 340 required for a post to Facebook (Facebook, Inc., Menlo Park, CA) may be identical to the tactic type 340 requires for a post to Instagram (also provided by Facebook, Inc.). The only difference is the platform to which the defined social media post is submitted. To avoid duplication and to allow the creation of a more useful user interface 200, the server data 110 of FIG. 3 separates the platform 360 from the definition of the tactic type 340. When a tactic 350 is created for a tactic type 340 that is related to multiple platform entity types 360, the tactic 350 will need to identify the platform 360 to which it applies. The association between tactic types 340 and its potential platforms 360 (if any) takes place at step 420. Next, step 425 defines the common fields for the tactic elements 350 (including the name, the timing information, and the actual and estimated costs). This step needs only be performed once as it defines the content of the basic tactic database entity 350.

Step 430 is responsible for defining the additional field definition entities 342 for the tactic types 340. As explained above, different tactic types 340 are to be associated with different sets of data fields. For example, a blog post is identified with a particular author, and therefore the definition of the blog post in the data store 110 must include a field for an author. Similarly, the product detail page definition in the data store 110 may need a field for a particular product identifier. But it makes no sense to track the author of a product detail page change, nor a product identifier for the blog post. Each field is important for its own tactic type 340, but perhaps irrelevant for a different tactic type 340.

In the prior art system, separate spreadsheets or data tables would need to be created for blog posts and for product detail changes because of the need to manage different sets of data fields for these different tactics. The blog post table would include a column for author, and the product detail changes would include a column for product identifier. But this separation of tactics into different data entities would complicate, or even render impossible, the creation of a common date-based user interface 200 that treats both types of tactics the same.

The system 10 avoids this by defining the tactic type entity 340 and the additional tactic field definitions 342 in steps 415 and 430. This is partially illustrated in FIG. 5, which shows a plurality of defined and populated tactic types 340. Tactic fields 510 are those data fields that are made available to all tactic types 340 and are therefore defined directly within the tactic data entity 350. This includes the name of the tactic 350, as well as the timing information for the tactic 350. The timing information can include a start date and a start time, and an end data and end time. These four fields can be located within all tactics 350, even if not every tactic 350 populates these fields with information. A fifth timing field could be a duration field, which is shown being used by the Type 4 tactic type 504.

Timing information could also include fields that define a repeat feature for the tactic 350. This type of information, which is not shown in the Figures, would allow a tactic 350 to repeat. In this way, repeat information is different than other timing fields in that it does not alter the starting point or the duration of the tactic 350. Rather, the repeat information would indicate that the same tactic 350 should appear multiple times in interface 200, separated from each other by the time period indicated in the repeat information. This would effectively operate in the same manner as a repeating calendar event in a traditional, computerized calendar. In at least one embodiment, each occurrence of the repeating tactic 350 would be implemented as separate tactics 350, thereby allowing estimated and actual costs to be stored separately in each of the instances of the tactic 350. The multiple instances of the repeating tactic 350 could nonetheless remain linked, allowing all of the repeating instances to be edited or deleted together.

FIG. 5 also shows the defined additional tactic fields 342 for the tactic types 340. These fields are defined in the additional tactic field definitions 342 defined for each tactic type 340. As shown in FIG. 5, there are two additional tactic field definitions 342 (Field 1 and Field 2) for the Type 1 tactic type 501, one additional tactic field definitions 342 (Field 3) for the Type 2 tactic type 502, and one additional tactic field definitions 342 (Field 4) for the Type 3 tactic type 503. The Type 2 tactic type 502 might be, for example, the blog post tactic type 340, with the "author" field being "Field 3" in FIG. 5.

Some of the additional tactic field definitions 342 can be reused between different tactic types 340. Thus, both Type 1 501 and Type 4 504 use Field 2, and both Type 1 501 and Type 5 505 use Field 1. Type 6 tactic type 506 does not use any additional tactic fields 342. A defined additional tactic field definition 342 will provide a name, a field type, and perhaps some validation rules for the additional field. The actual value for the field in association with a particular tactic 350 will be stored in a separate data entity 344 designed to hold these values. Thus, step 435 of method 400, which populates a new tactic 350 in the data store 110, requires both the addition of data into the common tactic fields 510 for a new tactic 350 as well as the creation and population of the additional tactic field values 344 for that new tactic 350. The creation of the additional tactic field value data entities 344 will be governed by the selected tactic type 340 for the new tactic 350, and the additional tactic field definitions 342 defined by the selected tactic type 340.

Note that FIG. 6 presents data entities 600 for a simplified embodiment of the server data 110. In FIG. 6, there are no user 310 or plan 320 entities, as the system 10 would function well for only a single user and a single plan, and therefore entities 310 and 320 would not be necessary. Channel data entity 330 is replaced with a category data entity 630, even though these two labels can be considered synonymous. The type 640 and tactic 650 entities, as well as the additional field definition entities 642 and the additional field value 644 entities exist and are used in the same way as entities 340, 350, 342, and 344, respectively. The budget entity 690 is used in the same manner as the budget entity 390 of FIG. 3, as is described below.

Returning to FIG. 4, step 440 populates tags 370 for the tactics 350. A user 310 can define particular tags to be used with a given plan 320. Each tag 370 can be associate with a particular "type," and a tag 370 for a particular plan 320 may be given its own date range and status. For example, a user 310 may define "Campaign" tags 370 by defining a plurality of tags 370 of the type "Campaign." In some embodiment, tag types are predefined, with types including campaigns, objectives, categories, phases, and keywords. The predefined tags can even be considered hierarchical, with "campaign" tags being considered a type of an "initiative" tag. In other embodiments, the user can define their own tag types.

Figure 7:
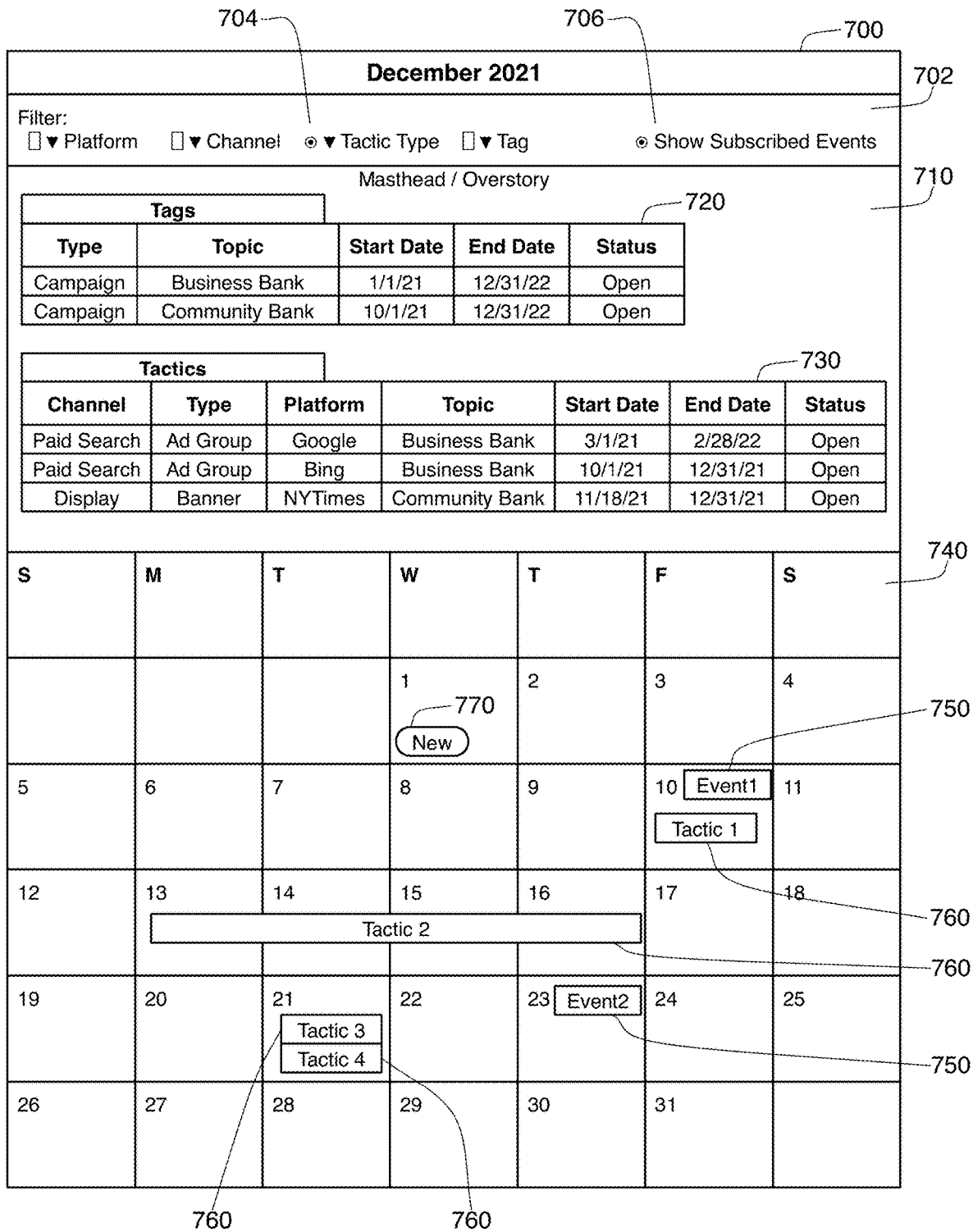
FIG. 7 is a user interface showing integrated date-related data.

At step 445, a user interface 200 is presented. An example interface 700 is shown in FIG. 7. This interface 700 presents a calendar-type interface 740 identifying tactics 350 of different types 340 having different field definitions. In this case, the calendar-type interface 740 is a monthly calendar for December 2021, although weekly, daily, quarterly, and annual calendars would be equally possible. In the calendar-type interface 740, individual dates are displayed visually separated from each other, in that each date is in a different box. In yet another embodiment, the calendar-type interface 740 is a "flow" view, in which channels 330 and tactic types 340 are used to organize tactics 350 on the left-hand side (left axis) of a table or chart view, dates (days, weeks, or months) are presented along the top portion (top axis) of the table/chart, and tactics 350 are presented at the cross-section of these two axes.

To generate this the calendar view 740, the server 100 examines all of the tactics 350 for this user 310 and plan 320 regardless of the tactic types 340. Dates, times, and durations are determined for all of the tactics 350, and relevant tactics 760 are presented visually on the interface. The relevant tactics 760 are those tactics 350 that are related to a time period established for the interface. In FIG. 7, four relevant tactics 760 are shown, namely Tactic 1 on December $10^{th}$, Tactic 2 on December 13-16, Tactic 3 on December 21, and Tactic 4 also on December 21. These four tactics 760 were relevant because their date data included a date in the relevant period for the interface, namely December 2021. Obviously, the interface 700 can include the ability to change this relevant period, either by moving to a different month, or by changing the duration of the relevant period, such as to a week, or a quarter.

In this way, the relevant tactics 760 are defined by the selected relevant time period (such as December 2021) of the interface. The relevant tactics 760 are also defined by the filters established at interface element 702. At this filtering interface element 702, the user can select to show only a selected platform 360, or a selected channel 330, or a selected tactic type 340, or a selected tag 370. Obviously, the user can also select multiple items in this filter, including multiple items in a single filtering section (such as multiple tags 370). In FIG. 704, a filled in selection icon 704 indicates that the relevant tactics 760 are limited by tactic type.

In one example, filtering by channel 330 could be used to view the data through a high level focus on that one channel. The monthly view could be switched with a multi-month or annual view, but since only a single channel 330 is viewed the calendar view (and the masthead 710, as described below) would not be overwhelmed by tactics 350 relating to other channels. In another example, the filtering 702 can exclude a channel 350 (or platform 360, or tactic type 340) to remove tactics 350 relating to the excluded element.

Element 706 shows that subscribed events 760 are also shown in the calendar interface 740. Subscribed events are events provided by the external calendar server 140. The external calendar can be subscribed to using a standard interface element found in other calendaring programs (not shown in the figures). In one embodiment, events found in a subscribed calendar are added as events 382 in the server data 110. The inclusion of the events 382 in the data store 110 simplifies the display of the relevant events 750 in the calendar view 740, and in the creation of cues, as is explained in detail in connection with FIGS. 9 and 10. The displayed events 750 may be useful for the user viewing the interface 700 to identify and plan tactics 350.

A masthead user interface element 710 (also known as an "overstory" element) is also shown in FIG. 7. The masthead portion 710 is created when creating the rest of the user interface 700 but is separated out as a separate step 450 in method 400. The masthead 710 is shown with two primary elements, namely the tags section 720 and the extended duration tactics section 730. The tags section 720 lists those tags 370 that have been associated with a date range including the currently displayed dates (in element 740). For example, two tags 370 are shown in element 720, namely a Campaign-type tag 370 with a topic of "Business Bank" and a second a Campaign-type tag 370 with a topic of "Community Bank." Both campaigns have a date range that covers the displayed time (December 2021). Displaying this information in the masthead 710 allows a user to see ongoing campaigns (or objectives or initiatives, or any other tag with a relevant date range). When tag types are predefined, only certain tags may be allowed to appear in the masthead 710. For example, only initiatives or campaigns can appear, while key words or categories do not. If tags 370 are defined hierarchically, the tags for presentation in user interface element 720 can be defined by this hierarchy, such as by showing only "Initiative" tags. In other embodiments, some tag types will not have date ranges available to them during creation, which would prevent their appearance in interface element 720. All tags 370 with complete data ranges would then be eligible for listing in interface element 720.

The extended duration tactics section 730 lists tactics 350 that have such a long date range that they would crowd or clutter (or otherwise render unattractive or unusable) the calendar view 740. For example, the three tactics shown in list 730 each extend through all of December 2021, and therefore would appear on every day of the calendar view 740. If they did so appear, they would crowd out the events 750 and other relevant tactics 760 that are shown in FIG. 7. Tactic 2 appears as a four-day segment in the calendar view 740, so shorter multi-day events can still appear in the calendar view 740. In some embodiments, a predefined or predetermined cut-off, such as fourteen or twenty-one days, is used to determine whether a multi-day tactic 350 appears in the calendar view 740 or in the extended duration tactics list 730. In this way, the extended duration tactics list 730 contains a first subset of the relevant tactics 350 to be displayed on interface 700, and the calendar view 740 contains a second subset.

In some embodiments, users use preferences to determine when tactics appear in the masthead 710 and when they appear in the calendar view 740. In some instances, users can identify individual tactics to always appear only in the masthead 710, or to never appear in the masthead 710. Alternatively, the users can identify a particular channel 330 (or tactic type 340) to always appear in the masthead 710. This could be achieved, for instance, by allowing a user to select masthead-only viewing when originally setting up the channel 330 in step 410.

In some embodiments, the filters 702 will filter not only the relevant tactics 760 in the calendar section 740, but also those items listed in sub-elements 720, 730 of the masthead 710. Furthermore, in one embodiment, the tags section element 720 and the extended duration tactics section 730 expand as necessary to show all available data. This will, of course, expand the size of the masthead section 710 of the interface 700. In other embodiments, the masthead section 710 is limited to a maximum size, meaning that scroll bars will be used in one or both of the sub-elements 720, 730 of the masthead 710 to make all the data available while still showing the whole calendar section 740.

In some embodiments, the relevant tactics 760 that appear in the calendar view 740 are color coded. For example, all tactics 350 associated with a given channel 330 in the data store 110 can appear in a single color so that tactics 350 from separate channels 330 are immediately apparent in the view. In one embodiment, an individual relevant tactic, such as Tactic 1 760, is color coded according to channel 330, includes an icon (such as an icon that represents the platform 360), includes header textual information (identifying the channel 330 and the tactic type 340), and includes the topic or name of the tactic 350. This is described below in more detail in connection with FIG. 12.

Budgeting

Returning to FIG. 4, the method at step 455 allows a user to define a budget 390 (also shown in FIG. 6 as element 690). The budget 390 defines a monetary (dollar) value to a channel 330. Although the budget 390 is shown in FIG. 3 as being associated with a channel 330, it is also possible to define a budget 390 to an overall plan 320 without separately budgeting each channel 330 in the plan 320. In other embodiments, a budget entity 390 can be assigned to a tactic type 340, or even to a specific tag 370. The important element is that the budget entity 390 is assigned to an identifiable set of tactics 350. The tactics 350 are each assigned an estimated cost value and an actual cost amount at step 460. The estimated costs and the budget 390 for a channel 330 can be defined at any point. Furthermore, new expenses actually accrued can be entered into a previously defined tactic 350.

Once defined, the system 10 tracks actual and estimated costs entered for each tactic 350, and is able roll up the data into data tactic types 340, channels 330, and even plans 620 based on the set of tactics 350 associated with the budget 390. When a financial report is desired, the system 10 at step 465 will add up the estimated and actual costs for each tactic 350, group these numbers by channel 330 (or by tactic types 340, by plan 320, or by tag 370), and present the results in a chart or spreadsheet for the user to review. In this way, the same system 10 that provides for the interface 700 the integrates different types 340 of tactics 350 also integrates actual dollars expended across multiple tactics 350 of different types 340 to create a comprehensive financial view of the plan 320 and the individual channels 330. The method 400 will then end at step 470.

Cues

In FIG. 7, user interface element 770 provides the user the ability to create a new tactic 350. While this is shown as a "New" button on Dec. 1, 2021, it is unlikely that an actual interface 700 will provide such a button on every day in the calendar view 740. More likely, a context-sensitive menu (after a hover-time or a right-click) would likely be provided to allow for the creation of a new tactic 350 on any day without the clutter effect of actual interface buttons.

FIG. 8 shows an interface 800 that might appear after selecting element 770 in order to allow a user to create a new tactic 350. The first part 810 of this interface 800 allows the user to create the context for this tactic 350. The user 310 and plan 320 are already populated, as these were defined by the information already known to the system about the user when showing interface 700. The user is provided the ability to input data into a field in order to select a channel 330 and a tactic type 340. In most cases, the user would first select a channel 330, and then relevant tactic types 340 for that channel 330 would be made available through a list. If the tactic type 340 selected utilizes platforms 360, the use will then select a platform 360 for this tactic type 340.

In portion 820, the user can input data into the standard tactic fields 510, namely a name or topic for the tactic 350 and the date and time information that will be used to place the new tactic 350 in interface 700. In this case, the date of Dec. 1, 2021, was inserted into the date field based on the context of the new tactic request from interface 700. At portion 830, the user can enter budget/estimated costs and actual costs, if any.

At portion 840, the additional tactic field definitions 342 are used to create inputs that insert data into the additional tactic field value entities 344. In most cases, this portion 840 would not appear until after the tactic type 340 is selected in portion 810, as the system 10 would not know which additional tactic fields 342 to use for this section until the type 340 is determined. Portion 840 shows the presence of these additional tactic field values 344 when entering data into a new tactic 350.

At portion 850, the user is allowed to assign tags 370 to the tactic 350. As explained above, these tags can be defined according to tag types. Interface portion 850 presents multiple selection elements for each of these types. These selection elements are shown by a downward arrowhead, indicating a pull-down menu. In FIG. 8, the user can assign an initiative, an objective, a category, a phase, and keywords to the tactic 350. Although all of these are represented in the data store 110 as tags 370, the use of tag types allows these tags 370 to appear almost as separate fields in the tactic 350. Of course, multiple tags may be associated with each tactic. Furthermore, tags can be grouped together through the tag type hierarchy described above, allowing (for instance) all initiative tags to be grouped together.

Portion 860 presents "cues" 380 that have been predefined for a tactic type 340 in the data store 110. The cues 380 automatically create subsidiary tactics 350 on the creation of a new tactic 350 of a certain type. Establishing cues 380 for repeated tactics 350 saves the user time, and helps ensure the companion tactics 350 will not be forgotten.

Figure 9:
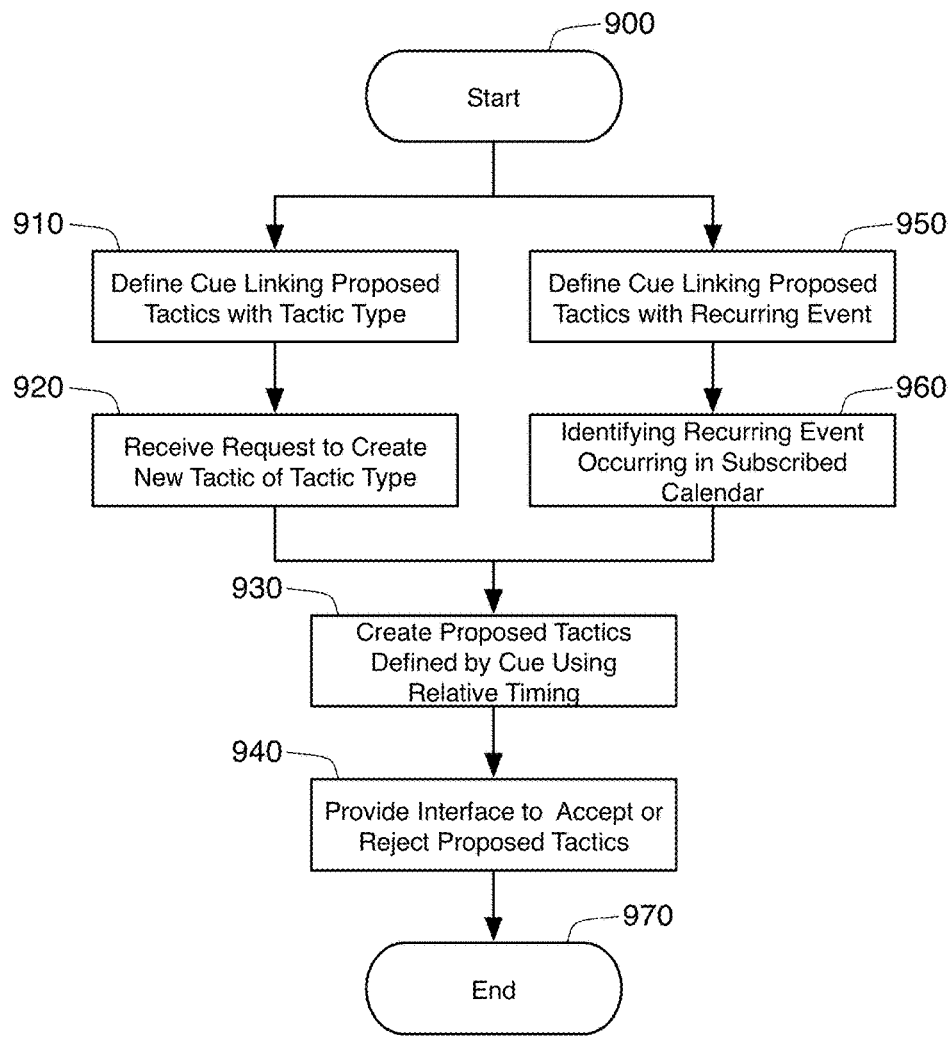
FIG. 9 is a flow chart showing a process for using cues to generate tactics.

The process 900 for defining and using cues 380 is shown in FIG. 9. This process starts at step 910, in which a cue entity 380 is defined in the data store 110. A cue 380 is associated with a particular tactic type 340. A new tactic 350 of this tactic type 340 can be considered the trigger for the cue entity 380. The purpose of the cue 380 is to create new companion tactics 350 for the trigger tactic 350.

Figure 10:
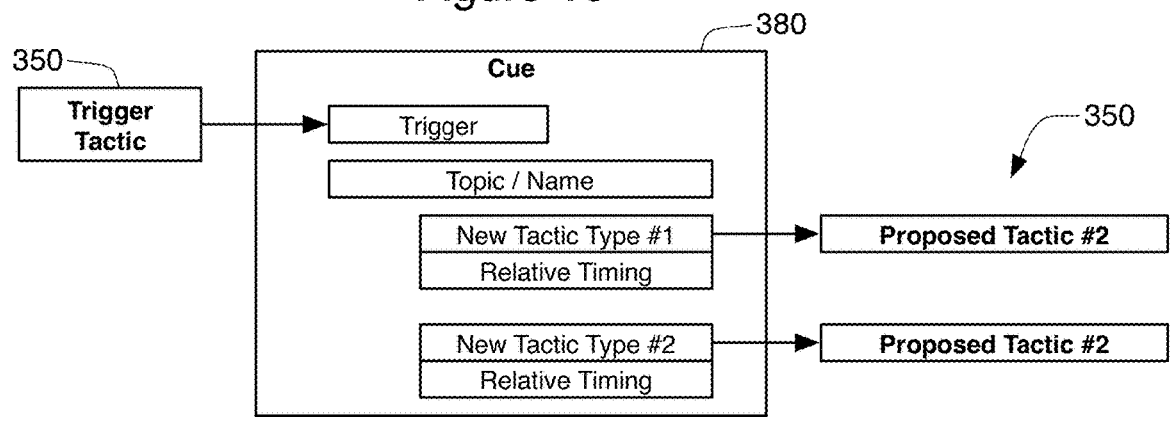
FIG. 10 is a schematic view showing the generation of proposed tactics by a cue.

This can be seen schematically in FIG. 10. The cue 380 is triggered whenever a new tactic 350 of the correct type 340 is created. Thus, in FIG. 8, once the tactic type 340 is defined, the cue(s) 380 for that type 340 can be identified. Each cue 380 will have a name/topic that will be used for the newly created tactics 350. A cue 380 will then identify one or more companion tactics to be created. In FIG. 10, two new tactics 350 are being created, one of type #1 one of type #2. Each new proposed tactic 350 defined by the cue 380 will also associated with relative timing information based on the timing of the trigger tactic 350.

Thus, at step 910 the cue 380 is defined. At step 920, a request is received to create a new tactic 350 of the trigger type 340, such as through the use of the new button 770 and the selection of the correct tactic type 340 in interface 800. At this point, the system 10 will create a new proposed tactic (or tactics) according to the cue 380 at step 930. Note that there was no specific user request to create the proposed tactic 350; rather the proposed tactic 350 was created automatically at step 930 by the server 100 based on the defined cue 380. The new tactics 350 will be assigned timing information based on the defined relative timing set forth in the cue 380. At step 940, the system 10 will provide some type of user interface to present these proposed new tactics 350 for acceptance or rejection by the user.

One example interface created by step 940 is portion 860 of FIG. 8. This portion shows proposed companion tactics from two different cues 870, 890. As shown in FIG. 3, multiple cues 380 can be associated with a single tactic type 340. The first cue has a topic 872 ("First Common Topic"), and then has two different proposed companion tactics 880 and 882. These tactics 880, 882 are shown in interface portion 860 along with their channel 330 and tactic types 340, as well as their relative time. Note that the relative time indicates the timing that will be assigned to the companion tactics 350 based on the timing of the main or triggering tactic 350. The first proposed subsidiary tactic 880 will appear two days before the tactic being generated in FIG. 8, at 8 am. This proposed tactic 880 will also extend in duration to the day of the tactic being generated. The second proposed tactic 882 will appear on the day of the tactic and will be an all-day tactic 882.

The second cue, cue #2 890 has a different title 892 and a single proposed companion tactic 894. The different title 892 is one reason why this cue #2 890 was created separately from cue #1 870. This proposed tactic 894 will appear seven days after the main tactic generated in interface 800.

The two cues 870, 890 will not generate any of the proposed subsidiary tactics 880, 882, 894 until their creation has been affirmed by the user. In one embodiment, delete buttons 862 are provided in interface section 860 associated with each of the proposed tactics 880, 882, 894. Using these buttons 862, then user can remove any undesired tactic 880, 882, 894. When the overall save button 895 is selected by the user, the primary tactic defined by interface 800, and the undeleted companion tactics defined by the relevant cues 380, will be saved into the server data 110. In other embodiments, the proposed tactics 880, 882, 894 are created upon the selection of the save interface 895, but they are only "provisional" or "preliminary" in nature and must be individually reviewed and approved before they will be included as active tactics 350 to be presented on interface 700.

Cues from Subscribed Calendar

Figure 11:
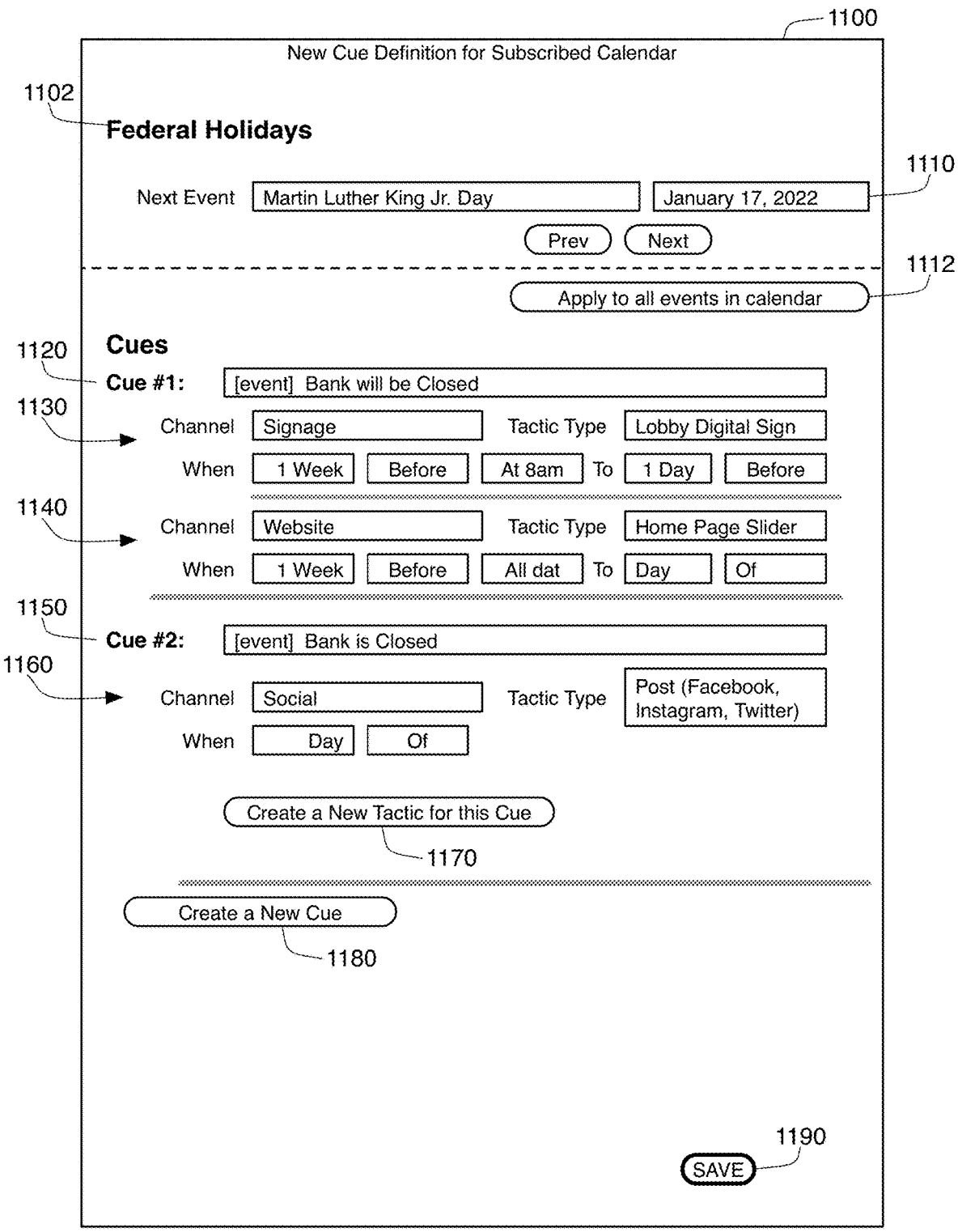
FIG. 11 is a user interface showing the definition of cues based on a subscribed calendar event.

FIG. 11 shows an interface 1100 that is associated with a subscribed calendar. In this case, the calendar is a Federal Holidays calendar, as indicated by title 1102. This interface 1100 is used to define cues 380 that are associated not with tactic types 340, but with events 382 from a subscribed calendar. In many cases, such as in the case of the federal holidays calendar, repeating events can be identified by the title for the event. As a result, an event in the calendar of a given name can be used by a cue 380 to trigger tactics 350.

Unlike interface element 860, which simply showed the proposed tactics 350 on the creation of a new tactic 350 of the correct type 340, interface 1100 allows for the definition of new cues. In this case, the cues are associated with a named event in a subscribed (or otherwise external) calendar. Two cues 1120 and 1150 have already been defined for a particular event 1110, namely "Martin Luther King Jr. Day" in the Federal Holidays calendar. The first cue 1120 has two predefined tactics 1130 and 1140. The second cue 1150 has one predefined tactic 1160. An interface element (button 1170) allows for the creation of a new tactic for the second cue 1150, and a different element (button 1180) allows for the creation of a new cue 380.

If the user were to save these cues (by hitting save button 1190), the system 10 would automatically create three tactics 350 based on the occurrence of Martin Luther King Jr. Day every year. In particular, the "Bank will be closed" cue 1120 creates a tactic 350 for a digital sign message at the bank's lobbies informing customers of the upcoming closure and a tactic 350 for a slider item on the homepage of the bank's website. These two tactics will have the topic "Martin Luther King Jr. Day Bank will be Closed" and will appear 1 week before MLK Jr. day. The third tactic 350 is a social media post on multiple platforms 360, will have the topic "Martin Luther King Jr. Day Bank is Closed," and will appear on MLK Jr. day.

The interface 1100 includes the ability to move to a previous and a next event in the subscribed calendar. In this way, the user can view all of the events 382 in the subscribed calendar assign cues 1120, 1150 to individual events. The interface also includes an option, in the form of button 1112, to assign the defined cues 1120, 1150 to all the events in the subscribed calendar. Simply by pressing button 1112, every federal holiday will be assigned the cues 1120, 1150 set forth in the interface.

Returning to FIG. 9, step 950 provides that a user will define a cue that links one or more proposed tactics (1130, 1140, or 1160) with a recurring event (such as event 1110) in a subscribed calendar. At step 960, the system 10 identifies the recurring event in the calendar. At this point, steps 930 and 940 will create the proposed tactics 350 and then present an interface to allow the users to accept or delete the proposed tactics. At this point, method 900 will end at step 970.

Although this is not shown in FIG. 11, the cues 380 may also include the ability to preestablish budget information for the companion tactics 1130, 1140, 1160. The same is true for the triggered tactics 880, 882, 894 shown in FIG. 8. In industries such as publicity and advertising, a particular budget value can be assigned to the triggering tactic 350 and the companion tactics 350 of the triggered cues 380. This budget information will be stored in server data 110, and then shared through other interfaces.

Calendar Detail

Figure 12:
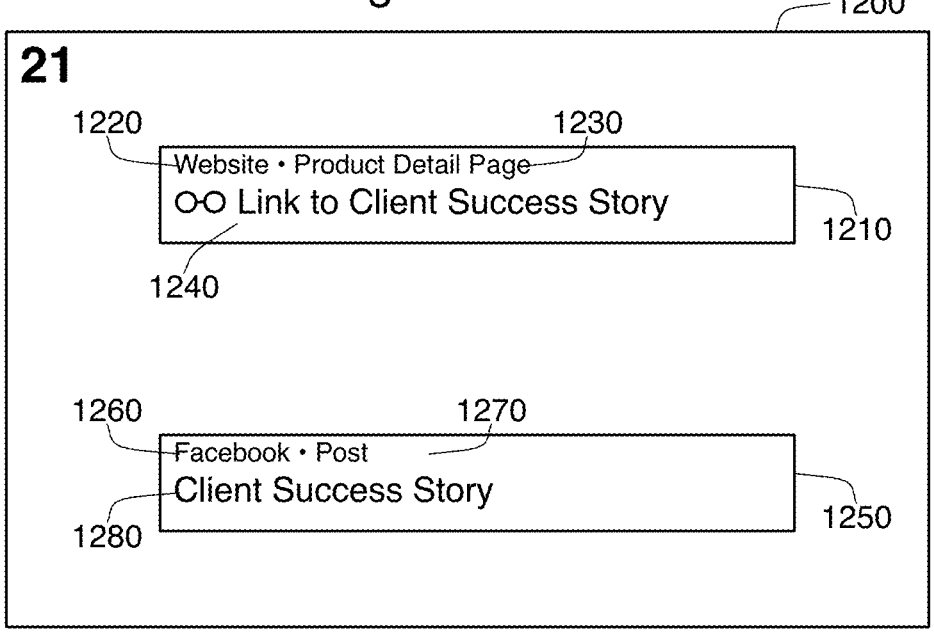
FIG. 12 is a detailed view of a portion of the interface provided in FIG. 7.

FIG. 12 shows an example portion 1200 taken from interface 700 shown in FIG. 7. Portion 1200 shows the 21st of Dec. 2021 and shows tactic 3 1210 and tactic 4 1250 in detail. Tactic 3 1210 relates to a tactic 350 with a title "Link to Client Success Story." This title can be the same as the name/topic stored in the internal tactic fields, or it can be derived from that field (such as by including only the first words up to a maximum number of characters. This topic 1240 is shown in relatively large letters inside a box 1210 shown in the interface segment 1200. A graphic is presented before this title. Above the topic 1240, and in smaller letters, is the channel label 1220 and the tactic type label 1230 for the displayed tactic 350.

Box 1250 contains information from tactic 4. The title 1280 is shown similarly in larger letters. The smaller text above this title 1280 shows the platform label 1260 and the tactic type label 1270. As explained above, not all tactic types 340 are associated with platforms 360. When they are, however, the platform 360 becomes important information for users to know about this tactic 350. As a result, the segment 1200 of interface 740 prioritizes the platform label 1260 over the channel label (such as label 1220) whenever a platform 360 is assigned to the tactic 350.

Lead Plans

Figure 13:
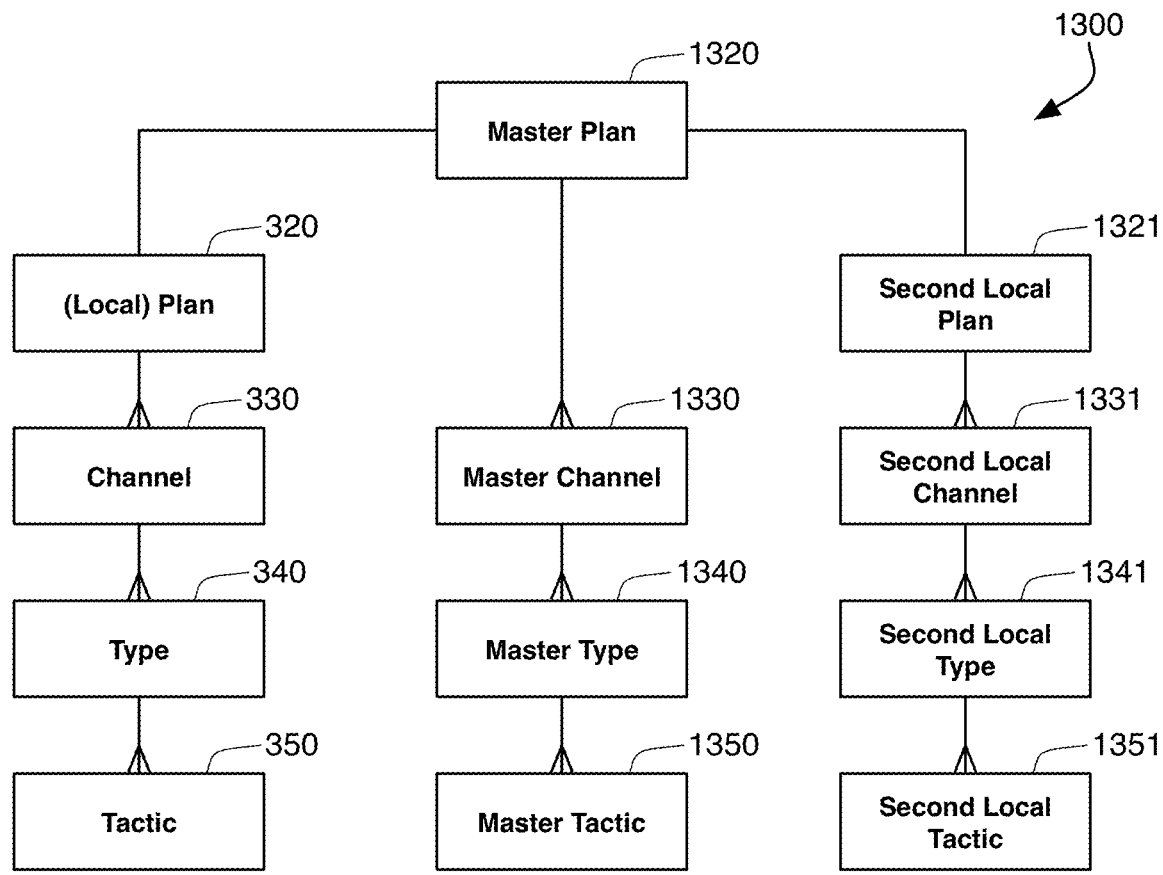
FIG. 13 is a schematic view of data used with hierarchical plans.

FIG. 13 shows data elements 1300 and relationships that form part of the server data 110 in another embodiment. In this embodiment, the plan 320, channel 330, type 340, and tactic 350 data elements remain. The plan 320, however, is considered a nested plan. A lead plan 1320 is established in data 1300 that exists in a hierarchy above the nested plan 320. The lead plan 1320 has its own lead channels 1330, lead tactic types 1340, and lead tactics 1350. These lead elements 1320, 1330, 1340, and 1350 operate in the same way, but in parallel, to the nested plan 320, channels 330, tactic types 340, and tactics 350.

This set up could be useful in an organization that has a natural hierarchy. For instance, a bank may have national staff that is responsible for national tactics 1350, such as national marketing events and publicity. A local bank may have local staff responsible for nested tactics 350. By establishing a lead plan 1320 over the nested plan 320, a user at the national level could see their lead tactics 1350 using the interfaces 200, 700. But, using filters such as filters 702, they could elect to also view all the nested tactics 350. In some embodiments, a second nested plan 1321 may be created for a second local bank that has its own nested channels 1331, nested types 1341, and nested tactics 1351. The national user could view all nested tactics 350, 1351 in their interface 200, 700 (and may even have editing rights over nested tactics 350, 1351), or examine only national level tactics 1350 (or examine only tactics 1351 associated with the second nested plan 1321). Meanwhile, a user from the first local branch could see their nested tactics 350 and could use filters 702 to also see national tactics 1350. In most cases, however, the local bank that could see nested tactics 350 could not see tactics 1351 from another, sister local bank.

In one embodiment, the interfaces 200, 700 that show tactics 350, 1350, 1351 from different levels of the hierarchy will visually distinguish between the plans 320, 1320, 1321. This can be done, for instance, by bolding or shading those tactics 1350 from the lead plan 1320, and leaving nested tactics 350, 1351 unbolded or unshaded. Alternatively, icons or acronyms could be used to distinguish between the lead tactics 1350 from the nested tactics 350, 1351.

Figure 14:
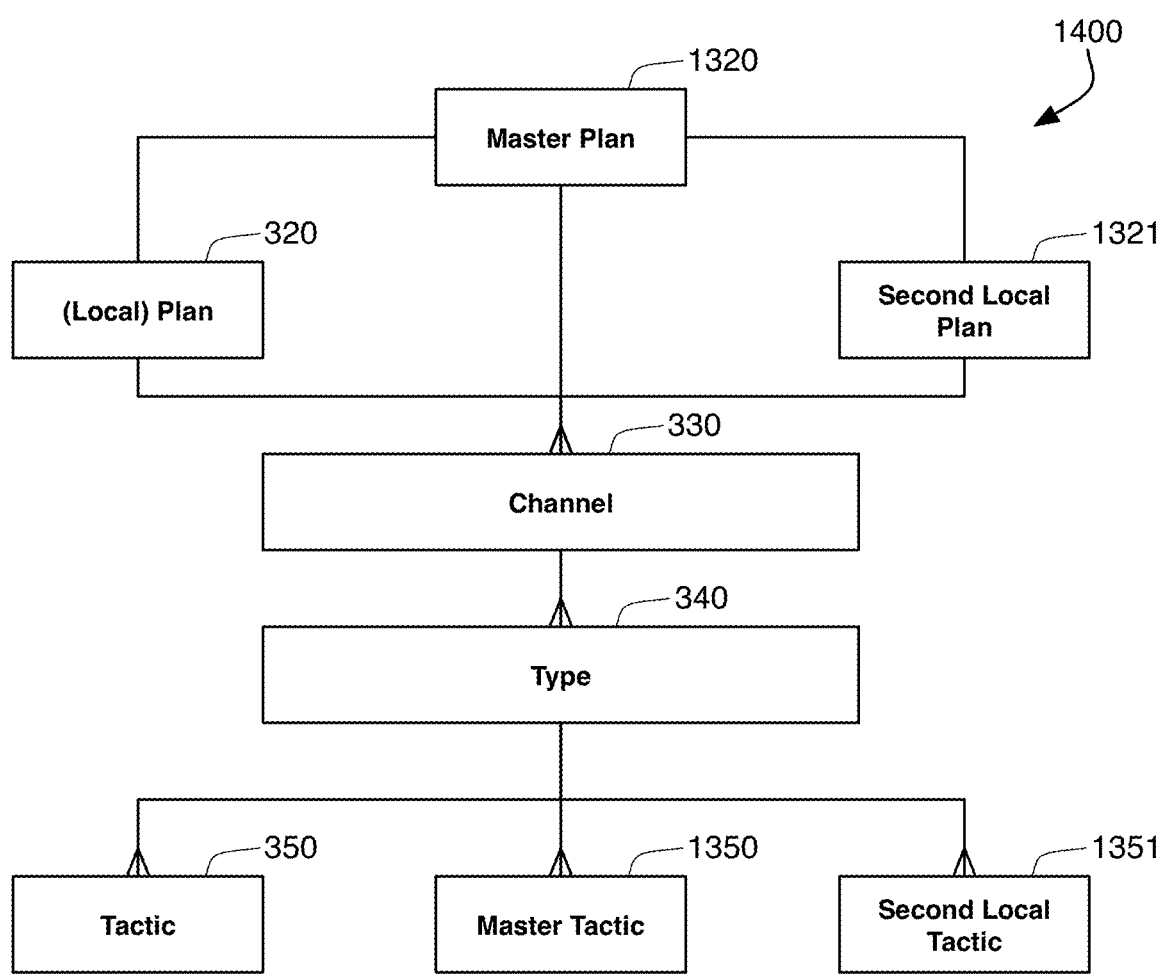
FIG. 14 is a schematic view of a second embodiment of data used with hierarchical plans.

One issue with the configuration set forth in FIG. 13 is the possibility of the nested channels 330 being defined differently than the lead channels 1330, and nested tactic types 340 being defined differently than lead tactic types 1340. FIG. 14 shows a different configuration of data 1400 in which the nested plans 320, 1321, and the lead plan 1320, share the same definitions for channels 330 and tactic types 340, even though they each maintain their own tactics 350, 1351, and 1350. This would aid both the local and national users when filtering data by channel 330 or type 340. Hybrid systems are also available where some channels 330 and types 340 are shared across multiple levels of the plan hierarchy, but each plan 320, 1320, and 1321 is given permission to develop additional channels 330 and types 340 as needed to meet their specific needs.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A method comprising:
   a) at a server computer, accessing in a database:
   i) a plurality of tactic entities each comprising internal tactic fields including date data and a topic,
   ii) a plurality of tactic type entities, wherein each tactic entity is associated with one tactic type entity,
   iii) a plurality of additional field definition entities, wherein each additional field definition entity is associated with one tactic type entity, further wherein a first tactic type entity is associated with a first set of additional field definition entities and a second tactic type entity is associated with a different, second set of additional field definition entities,
   iv) a plurality of additional field value entities, wherein each additional field value entity is associated with one additional field definition entity and one tactic entity, and
   v) a plurality of channel entities, wherein each channel entity is associated with a set of tactic type entities;
   b) presenting a date-based user interface for a relevant period to a user having:
   a dated view portion showing a plurality of visually separated dates for the relevant period, wherein data from tactic entities that have date data in the relevant period are displayed within the visually separated dates;
ii) a masthead portion, the masthead portion displaying tactic entities that have a duration longer than a predetermined period, wherein the tactic entities displayed in the masthead portion are not displayed in the dated view; and
iii) a filter interface element for allowing filter input from the user relating to channel entities and tactic type entities;
c) receiving filtering input through the filter interface element selecting one from a set comprising a selected channel and a selected tactic type;
d) at the server computer, filtering the plurality of tactic entities based on the filtering input to select a relevant subset of the tactic entities; and
e) re-presenting the date-based user interface to the user to present only the relevant subset of tactic entities, wherein the tactic entities displayed in the dated view portion are altered to be limited to those within the relevant subset of tactic entities, further wherein the tactic entities displayed in the masthead portion are also are altered to be limited to those within the relevant subset of tactic entities.

2. The method of claim 1, wherein the visually displayed data is derived in part from the topic in the internal tactic fields.

3. The method of claim 1, wherein relevant period is a single calendar month, and the dated view is a monthly view.

4. The method of claim 1, wherein the filtering step filters based on the channel entities associated with the tactic type entities associated with the tactic entities.

5. The method of claim 1, wherein the masthead portion is displayed in the date-based user interface above the dated view.

6. The method of claim 5, wherein the tactic entities displayed in the masthead view are displayed as a list.

7. The method of claim 1, wherein the server computer accesses data in the database from a plurality of tag entities containing tag date data, each tag entity being associated with at least one tactic entity, the filtering step further filters the tag entities to select a first set of tag entities having tag date data including a tag date in the relevant period, and the masthead portion further comprises a list of the first set of tag entities.

8. The method of claim 7, wherein the tag entities are displayed in the masthead portion include a set of tag entities that do not contain date data.

9. The method of claim 1, wherein the internal tactic fields of the tactic entities include actual cost data, and further comprising the server computer accessing data in the database from a plurality of budget entities, wherein the budget entities each have a budget amount and each are associated with a set of tactic entities, further comprising:
d) at the server computer, rolling up the actual cost data of the tactic entities based on the sets of tactic entities, and
e) at the server computer, displaying the rolled up actual cost data along with the budget amounts for the associated budget entities.

10. The method of claim 9 wherein the budget entities are each associated with the set of tactic entities by associating the budget entities with the channel entities.

11. The method of claim 9, the server computer accesses data in the database from a plurality of tag entities, each tag entity being associated with at least one tactic entity, and further wherein the budget entities are each associated with the set of tactic entities by associating the budget entities with the tag entities.

12. The method of claim 1, wherein the database comprises a first cue entity that is associated with a trigger tactic type entity defining a first tactic type and with a companion tactic type entity defining a second tactic type; further wherein the date-based user interface further comprises a new tactic interface element; further comprising:
f) at the server computer, receiving a request from a user to create a new tactic entity of the first tactic type through selection of the new tactic interface element;
g) at the server computer,
   i) presenting a new tactic interface to the user,
   ii) receiving context input from the user through the new tactic interface, and
   iii) creating a first new tactic entity of the first tactic type;
h) at the server computer, identifying the first cue entity based on the association between the first cue entity and the trigger tactic type entity;
i) at the server computer, identifying the second tactic type based on the association between the first cue entity and the companion tactic type entity; and
j) at the server computer, creating a second new tactic entity of the second tactic type without first receiving a new request from the user to create any tactic entity of the second tactic type.

13. The method of claim 12, wherein the first cue entity defines date data for the second new tactic entity that is based upon date data for the first new tactic entity.

14. The method of claim 1, wherein the database comprises event entities containing data received from an external calendar and a first cue entity that is associated with a trigger event entity and with a companion tactic type entity defining a first tactic type; further comprising:
f) at the server computer, identifying the trigger event entity and an associated date;
g) at the server computer, identifying the first cue entity based on the association between the trigger event entity and the first cue entity;
h) at the server computer, identifying the first tactic type based on the association between the first cue entity and the companion tactic type entity; and
i) at the server computer, creating a new tactic entity of the first tactic type without first receiving a new request from the user to create any tactic entity of the first tactic type.

15. A method comprising:
a) at a server computer, accessing in a database:
   i) a plurality of tactic entities each comprising internal tactic fields including date data and a topic,
   ii) a plurality of tactic type entities, wherein each tactic entity is associated with one tactic type entity,
   iii) a plurality of additional field definition entities, wherein each additional field definition entity is associated with one tactic type entity, further wherein a first tactic type entity is associated with a first set of additional field definition entities and a second tactic type entity is associated with a different, second set of additional field definition entities,
   iv) a plurality of additional field value entities, wherein each additional field value entity is associated with one additional field definition entity and one tactic entity, and
   v) a plurality of channel entities, wherein each channel entity is associated with a set of tactic type entities;

wherein the server computer accesses data in the database from a plurality of plan entities each being associated with at least one channel entity, further wherein a lead plan entity is associated with a nested plan entity, further wherein a lead set of tactic entities are each associated with the lead plan entity through the tactic type entities and the channel entities, and further wherein a nested set of tactic entities are each associated with the nested plan entity through the tactic type entities and the channel entities;

b) presenting a date-based user interface for a relevant period to a user having:
  i) a dated view portion showing a plurality of visually separated dates for the relevant period, wherein the dated view shows both the lead set of tactic entities and the nested set of tactic entities while visually distinguishing between the lead set of tactic entities and the nested set of tactic entities,
  ii) visually displayed data from the lead set of tactic entities that are displayed within the visually separated dates om the dated view portion according to the entity date, wherein the visually displayed data from the first tactic entity is displayed in a first visually separated date and data from the second tactic entity is displayed in a second visually separated date, wherein the lead set of relevant tactic entities have date data including an entity date in a relevant period, and
  iii) a filter interface element for allowing filter input from the user relating to channel entities and tactic type entities;

c) receiving filtering input from the filter interface element selecting to view the nested set of tactic entities;

d) at the server computer, filtering the plurality of tactic entities based on the filtering input to select a relevant subset of the tactic entities including both the lead set of tactic entities and the nested set of tactic entities; and e) re-presenting the date-based user interface to the user to present the relevant subset of tactic entities in the dated view portion are altered to be limited to those within the relevant subset of tactic entities.

16. A method comprising:
a) at a server computer, accessing in a database:
  i) a plurality of tactic entities each comprising internal tactic fields including date data and a topic, and
  ii) a plurality of tactic type entities, wherein each tactic entity is associated with one tactic type entity;
b) creating presenting a date-based user interface having:
  i) a dated view portion showing a plurality of visually separated dates for a relevant period, wherein data from a first subset of a set of relevant tactic entities that have date data in a relevant period are displayed within the visually separated dates,
  ii) a masthead portion displaying a second subset of the set of relevant tactic entities having a duration longer than a predetermined period, wherein the second subset of the set of relevant tactic entities is not displayed in the dated view, and
  iii) a filter interface element for allowing filter input from the user relating to tactic type entities;
c) receiving filtering input through the filter interface element selecting a selected tactic type;
d) at the server computer, filtering the plurality of tactic entities based on the filtering input to select a relevant subset of the tactic entities; and
e) re-presenting the date-based user interface to the user to present only the relevant subset of tactic entities, wherein the tactic entities displayed in the dated view portion are altered to be limited to those within the relevant subset of tactic entities, further wherein the tactic entities displayed in the masthead portion are also altered to be limited to those within the relevant subset of tactic entities.

17. The method of claim 16, wherein the server computer accesses data in the database from a plurality of tag entities having tag date data, each tag entity being associated with at least one tactic entity, the filtering step further filters the tag entities to select a first set of tag entities having tag date data including a tag date in the relevant period, and the masthead portion further comprises a list of the first set of tag entities.

* * * * *